INVENTOR
PIERRE MARCEL BOURDON
by Campbell Brumbaugh + Free
his ATTORNEYS

Sept. 1, 1953    P. M. BOURDON    2,650,721
SHOCK ABSORBER FOR RAILWAY DRAFT RIGGINGS
Filed Nov. 22, 1947    3 Sheets-Sheet 3

INVENTOR.
PIERRE MARCEL BOURDON
BY
HIS ATTORNEYS.

Patented Sept. 1, 1953

2,650,721

UNITED STATES PATENT OFFICE 2,650,721

SHOCK ABSORBER FOR RAILWAY DRAFT RIGGINGS

Pierre Marcel Bourdon, Paris, France, assignor to Manufacture de Caoutchouc Michelin (Puiseux, Boulanger & Cie), Clermont-Ferrand, France Application November 22, 1947, Serial No. 787,554
In France December 12, 1946

5 Claims. (Cl. 213—45)

This invention relates to shock-absorbing devices for the draft rigging of railway vehicles and it has as an object the provision of a shock-dampening system for railway vehicles for absorbing the shocks that occur during rapid acceleration and deceleration of the vehicles.

Another object of the invention is to provide a shock-absorbing device capable of absorbing the violent shocks occurring during the coupling of railway vehicles and, in particular, the shocks due to the rough handling of the vehicle during switching operations.

Another object of the invention is to provide shock absorbers for reducing abnormal shocks produced by railroad accidents.

The invention consists generally in providing a shock-absorbing device in the drawbar assembly or draft rigging of a railway vehicle which is capable of absorbing shocks produced during acceleration and deceleration of the vehicle.

The shock-absorbing device includes generally two different types of shock dampeners, one of which acts principally during acceleration of the vehicle, while the other acts principally during deceleration of the vehicle. The dampener which is used principally during acceleration of the vehicle includes a resilient rubbery connection between two elements of the drawbar assembly which allows them to move relatively apart when a tractive force is exerted on a coupling associated therewith.

The shock dampener acting principally during deceleration of the vehicle may consist of a series of resilient sleeves and rigid sleeves connected alternately to each other so that the shock dampeners can be compressed or stretched against the resiliency of the resilient sleeves. This shock dampener is so arranged with respect to the drawbar assembly and a structural element of the vehicle frame that substantial movement of these elements is permitted against increasing resistance to absorb the deceleration shocks.

The above-described shock-absorbing mechanism may also be associated with separate buffer structures which come into use in the event of abnormal deceleration shocks, such as those occurring, for example, in railroad accidents.

For a better understanding of the present invention, reference may be had to the accompanying drawing, in which.

Figure 3:
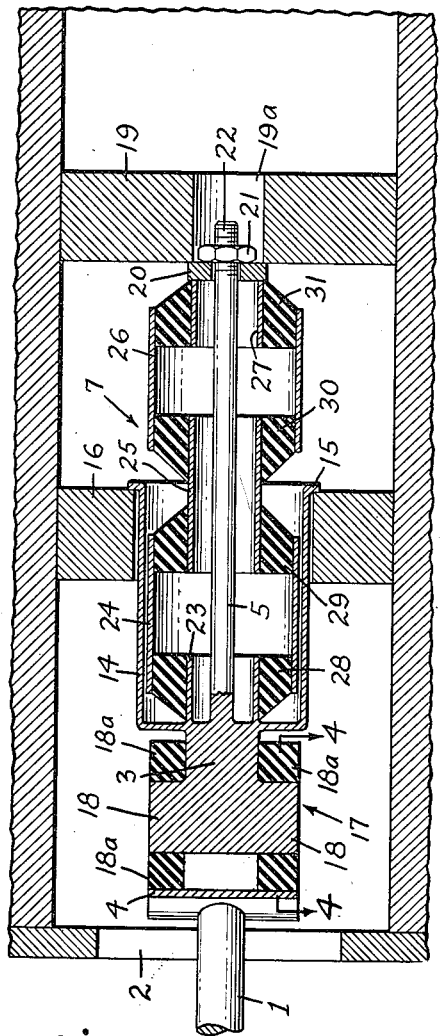
Fig. 3 is a view in section taken on line 3—3 of Fig. 1.
Figure 4:
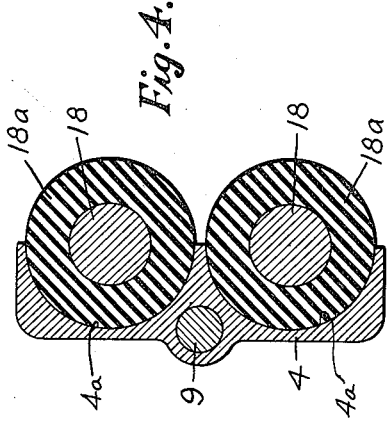
Fig. 4 is a view in section taken on line 4—4 of Fig. 3.

With the form of shock-absorbing device illustrated in the drawings and described hereinafter, any suitable type of couplers for the two railroad cars or vehicles may be used. The couplers do not form a part of the present invention and may be of the type disclosed in the French Patent No. 786,423, dated February 28, 1935. One coupler is secured to a drawbar or coupler shank 1 which is pivotally connected to a yoke member 4 by means of a pivot pin 9. The yoke member forms one element of a resilient or shock-absorbing dampener 17 which acts primarily during acceleration of the vehicle. The dampener 17 includes a pair of cylindrical metal pins 18 which are rigidly mounted on a cross head 3, as shown in Fig. 3. The pins extend into and are bonded to the rubber rings 18a which, in turn, are bonded to the concave or curved faces 4a of the yoke 4. The resilient rings 18a allow the yoke 4 and the cross head 3 to move relatively when a force is exerted on the drawbar 1 to start and accelerate the railway vehicle.

A tubular sleeve 14 is rigidly secured to the cross head 3 rearwardly of the pins 18. The sleeve 14 which forms a draft and guide element extends slidably through a cross member 16 or transverse sill of the vehicle frame. The sleeve has an outwardly extending flange 15 at its rear end providing a forwardly facing shoulder which is movable into and out of engagement with the transverse sill member 16. When a tractive force is exerted on the coupler shank 1, the sleeve 14 is pulled through the sill member 16 until the flange 15 engages the rear surface of the sill thereby providing a positive coupling between the cross head 3 and the vehicle frame to start or accelerate the vehicle. When a tractive force is exerted on the drawbar 1, the rubber blocks 18a yield resiliently to cushion or dampen the shocks resulting from the tractive force.

The part of the shock absorber forming a dampener for decelerating movements of the vehicle and for dampening collision shocks during switching operations and the like, will now be described.

The cross head 3 has a rigid extension thereupon consisting of a rod 5 having a threaded end 22 which slides freely inside a transverse sill member 19 spaced from and fixed with respect to the sill 16. The rod 5 carries slideably a washer 20 adapted to bear against the front face of the sill 19. A nut is screwed on the end of the rod to retain the washer in position. The nut is freely movable axially of the opening 19a in the sill 19.

Between the cross head 3 and the washer 20 is disposed a dampener or shock-absorbing system 7 which includes, in the case illustrated, four dampener elements arranged in couples. The dampener system 7 includes a plurality of spaced apart rigid tubular sleeves 23, 24, 25, 26 and 27, which are connected in series by means of a plurality of resilient rubber rings 28 to 31.

The sleeve 23 is fixed to the cross head 3 and is bonded to the interior of the rubber ring 28. The tubular sleeve 24 is bonded to the exterior of the rubber ring 28 and the exterior of the rubber ring 29. The small tubular sleeve 25 is bonded to the interiors of the rubber rings 29 and 30. The large sleeve 26 is bonded to the rubber rings 30 and 31. The small sleeve 27 is bonded to the interior of the ring 31 and bears against the washer 20.

When the dampener 7 is being assembled, the rubber rings 28, 29, 30 and 31 may be compressed to a desired degree by adjusting the nut 21 on the rod 5 which varies the over-all length of the dampener system 7 and accordingly increases or decreases the stresses and/or compression of the rubber rings 28 to 31.

The dampener system 7 acts during deceleration of the vehicle to cushion the relative movement of the vehicles. In the case of deceleration forces, the movement of the vehicle relative to the couplers forces the washer 20 along the rod 5 toward the coupler so that all of the sleeves 23 and 27 are compressed toward each other thereby deforming the rubber rings 28 to 31 so they absorb the deceleration forces.

Figure 1:
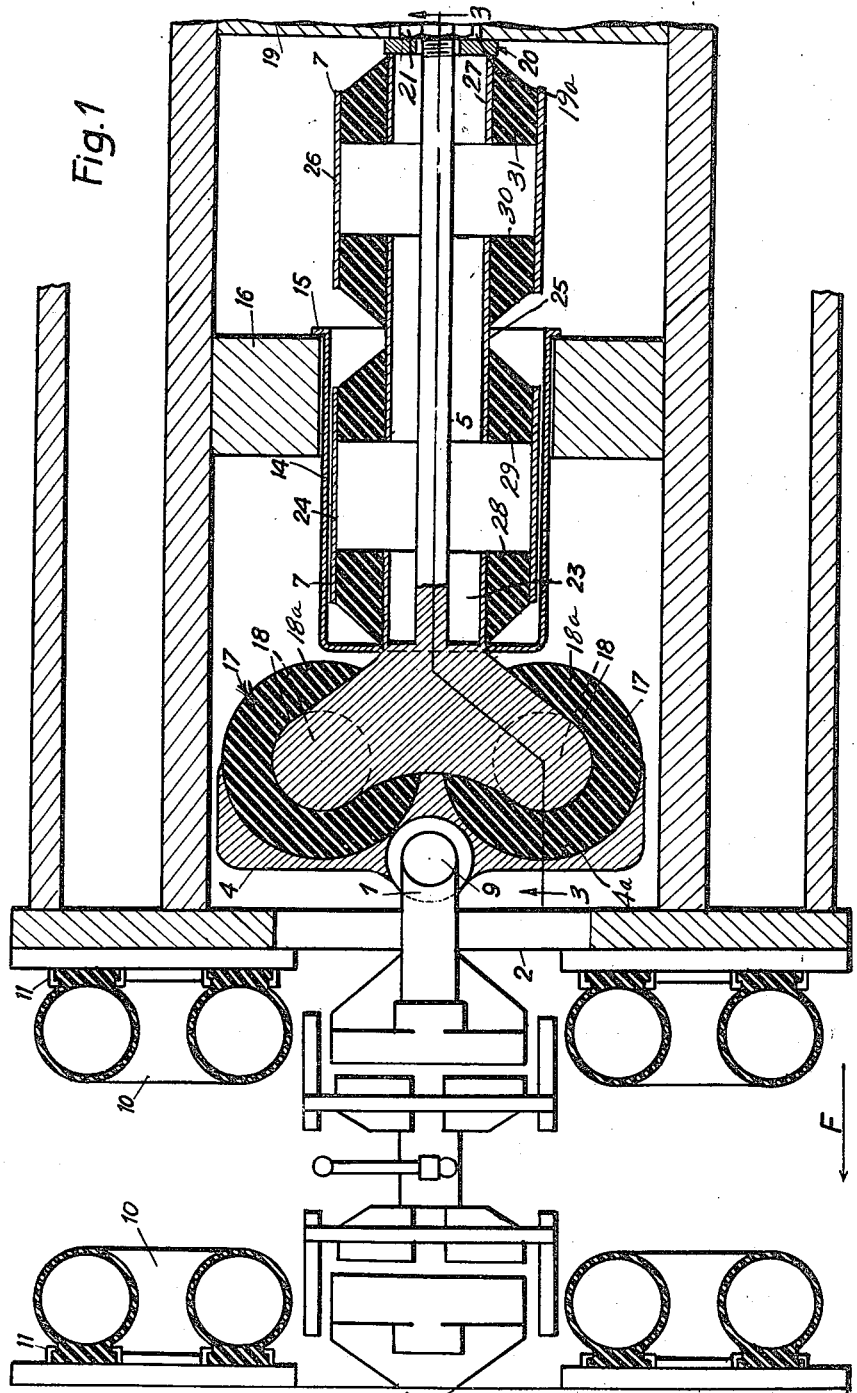
Fig. 1 is a view in horizontal section through a shock-absorbing device of the type embodying the present invention and disclosing diagrammatically car couplers and a vehicle frame structure associated with the shock-absorbing device.
Figure 2:
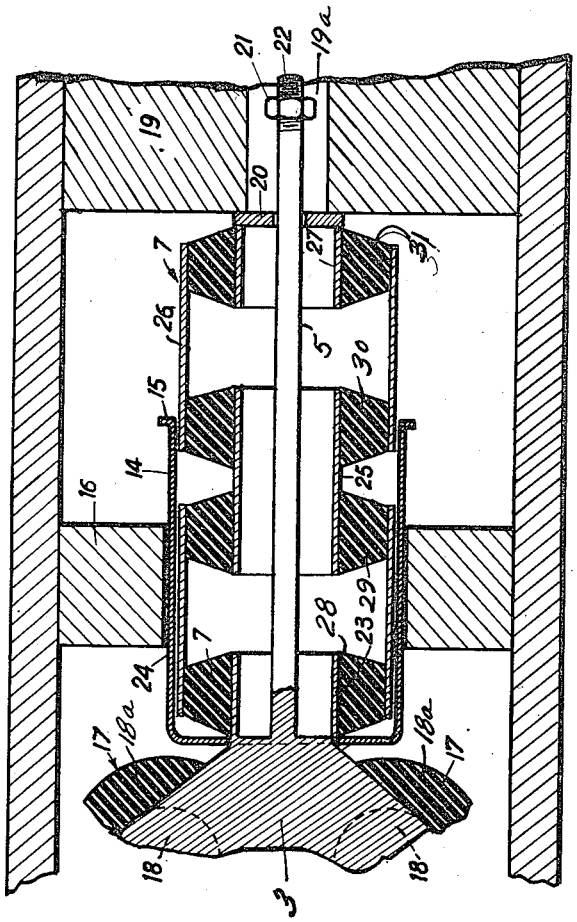
Fig. 2 is a view similar to Fig. 1 showing the shock-absorbing device in the position assumed when the vehicle slows down or when two railroad vehicles collide during switching operations.

In this way, the rubber components of the dampener system 7 serve as cushions to dampen the relative movement between the couplers and the vehicles during deceleration. In particular, the dampeners 7 may be deformed so as to assume more or less the shape illustrated in Fig. 2. During this displacement, the distance between the cross head 3 and the washer 20 is reduced and consequently the end of the rod 5 carrying the nut 21 enters the opening 19a provided for this purpose inside the cross member 19. At the same time, the sleeve 14 slides over the outside of the dampener system 7 and its flange 15 is no longer in contact with the cross member 16.

The arrangement adapted to absorb abnormal shocks consists of the pneumatic ring-shaped members 10 which are inflated under a considerable pressure and securely held by means of suitable supports or beads inside the carrier members 11 that are secured in turn to the outermost cross members or sills 2 of the cooperating vehicles. When the maximum displacement allowed by the dampener system 7 for the two vehicles coupled together is reached, the inflated air tubes 10—10 of the two vehicles come into contact and form powerful dampeners. If the shock is particularly violent, the crushing of the pneumatic tubes may be sufficient to make them burst before the two vehicles collide. The pneumatic tubes act thus as breaking partitions and are thus adapted to absorb large amounts of kinetic energy.

It will be understood that my shock-absorbing device produces, in all cases, a very gradual dampening that avoids to a large extent any objectional effect or feeling due to shocks either when starting or when slowing down or stopping. From this standpoint, it is far preferable to the usual spring arrangements, the action of which is inadequate especially in the case of sudden stoppages.

Furthermore in the prior spring arrangements, the same dampeners are used both for normal deceleration and for abnormal shocks. Consequently, either such prior dampeners are very rigid in order to provide for proper efficiency in the case of abnormal shocks and consequently they are too rigid for normal deceleration, or else they are yielding enough to operate for normal decelerations, in which case they are not adequate to absorb rough shocks.

On the contrary, according to my invention, the dampeners 10 that are operative for rough shocks are separate from the normal deceleration and stoppage dampeners constituted by the dampener systems 17 and 7.

In all known arrangements, the usual buffers may in the case of extremely violent shocks break or become misaligned in which case they become ineffective. They may, in fact, damage the railroad equipment or wound the passengers.

On the other hand, the pneumatic tubes 10, if their diameter is sufficient, remain at least partially in register with the tubes of the adjacent car, even if their centers are no longer in alignment. In all cases, they never have any sharp parts or any parts with abrupt edges capable of damaging or perforating the vehicle walls or of wounding the attendants or passengers.

It should be understood that while the draft rigging preferably includes the dampener system 17, the dampener 7, and the ring-shaped dampeners 10—10, they may also be used separately or associated two by two, as desired.

The structural details of the sleeve 14, the rod 5 with its washer 20 and nut 21 have been disclosed by way of examples and may be modified according to requirements.

Accordingly, the above-described form of the invention should be considered as illustrative and not as limiting the scope of the following claims.

What I claim is:

1. A shock absorber for railway draft rigging comprising a yoke member to be connected with a coupler, a cross head member, resilient rubbery means interposed between and connecting said cross head member to said yoke member, a sleeve-like draft member fixed to said cross head member and extending therefrom away from said yoke member and having a shoulder adjacent to its outer end, said shoulder having a surface thereon facing toward said cross head member to engage a structural element of a railway vehicle, a stem fixed to said cross head member and extending therefrom lengthwise within and beyond said outer end of said draft member, a retaining member on said stem and movable lengthwise thereof, and a dampener extending lengthwise of said stem between said cross head member and said retaining member and urging them apart, said dampener including at least two substantially concentric, tubular sleeves in overlapping relation and a ring of rubbery material bonded to and interposed between said sleeves to connect them for resiliently opposed relative endwise movement, one of said sleeves being in engagement with said yoke member and the other in engagement with said retaining member.

2. A shock absorber for railway draft rigging comprising a yoke member to be connected pivotally to a coupler, a cross head member, resilient means interposed between and connecting said cross head member to said yoke member for resiliently opposed relative movement, a draft and guiding member fixed at one end to said cross head member extending therefrom away from said yoke member, said draft member having a shoulder thereon, said shoulder having a surface thereon facing toward said cross head member, a stem fixed at one end to said cross head member and extending lengthwise of said draft and guiding member, a retaining member on said stem and movable lengthwise thereof, and a dampener extending lengthwise of said stem between said cross head member and said retaining member and urging them apart, said dampener including at least two substantially concentric, tubular sleeves in overlapping relation and a ring of rubbery material bonded to and interposed between said sleeves to connect them for resiliently opposed relative endwise movement, one of said sleeves being in engagement with said yoke member and the other in engagement with said retaining member.

3. A shock absorber for railway draft rigging comprising a yoke member, a cross head member, resilient means connecting said yoke member to said cross head and resiliently resisting movement of said yoke and cross head members away from each other, a draft member for slidably connecting said cross head member to a structural element of a railroad vehicle, said draft member being fixed at one end to said cross head member and having a shoulder adjacent its opposite end to engage said structural element and limit movement of said cross head away from said structural element, a stem fixed at one end to said cross head member and extending lengthwise of said draft member, a retaining member slidably mounted on said stem and engageable with another structural element of said vehicle, and a resilient dampener interposed between said cross head member and said retaining member normally urging said retaining member toward, and said cross head member away from said another structural element.

4. A shock absorber for railway draft rigging comprising a cross head member, a guiding and connecting member fixed at one end to said cross head member and extending outwardly therefrom, a shoulder on said guiding and connecting member having a surface thereon facing toward said cross head member, a stem fixed to said cross head member and extending lengthwise of and beyond said guiding and connecting member, a retaining member slidable lengthwise of said stem, adjustable means on the outer end of said stem to limit outward movement of said retaining member, and a resilient dampener interposed between said cross head member and said retaining member and normally urging them apart.

5. The shock-absorbing device set forth in claim 4 in which the dampener comprises a plurality of sleeves each having opposite end portions, at least one of said sleeves being of a different diameter than the others and rings of rubbery material connecting the opposite end portions of said one sleeve to end portions of two other sleeves, said rings being interposed between said end portions to maintain said sleeves in coaxial spaced apart relation and said one sleeve in partially telescoped relation to said two other sleeves, a sleeve at one end of the dampener abutting against said cross head member and a sleeve at the opposite end abutting against said retaining member.

PIERRE MARCEL BOURDON.

References Cited in the file of this patent

UNITED STATES PATENTS

| Number | Name | Date |
|---|---|---|
| 382,840 | Starr | May 15, 1888 |
| 1,810,717 | Lord | June 16, 1931 |
| 2,126,707 | Schmidt | Aug. 16, 1938 |
| 2,165,375 | Heitner | July 11, 1939 |
| 2,212,843 | Metzger | Aug. 27, 1940 |
| 2,259,440 | Fageol | Oct. 21, 1941 |
| 2,263,599 | Tucker | Nov. 25, 1941 |
| 2,320,619 | Larsson | June 1, 1943 |
| 2,336,969 | Tack | Dec. 14, 1943 |
| 2,491,158 | Brennan | Dec. 13, 1949 |

FOREIGN PATENTS

| Number | Country | Date |
|---|---|---|
| 372,471 | Italy | June 30, 1939 |